United States Patent
Ebner (10) Patent No.: US 10,200,331 B2
(45) Date of Patent: Feb. 5, 2019

(54) METHODS AND SYSTEMS FOR PERFORMING STRUCTURE-PRESERVING OBFUSCATION ON EMAILS

(71) Applicant: Xerox Corporation, Norwalk, CT (US)

(72) Inventor: Fritz Francis Ebner, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/635,350

(22) Filed: Jun. 28, 2017

(65) Prior Publication Data

US 2019/0007358 A1     Jan. 3, 2019

(51) Int. Cl.
| | |
|---|---|
| H04L 12/58 | (2006.01) |
| G06F 3/12 | (2006.01) |
| G06F 17/27 | (2006.01) |
| H04N 1/00 | (2006.01) |
| H04N 1/32 | (2006.01) |

(52) U.S. Cl.
CPC ............ *H04L 51/22* (2013.01); *G06F 3/1222* (2013.01); *G06F 3/1238* (2013.01); *G06F 3/1275* (2013.01); *G06F 3/1287* (2013.01); *G06F 17/274* (2013.01); *H04N 1/00212* (2013.01); *H04N 1/32272* (2013.01); *H04N 1/32283* (2013.01); *H04N 2201/0082* (2013.01)

(58) Field of Classification Search
CPC ............................ H04L 51/22; G06F 21/6245
USPC ............................................................ 704/9
See application file for complete search history.

(56) References Cited

U.S. PATENT DOCUMENTS

| 10,037,413 | B2* | 7/2018 | Ghafourifar ............ G06F 21/10 |
| 2016/0148014 | A1 | 5/2016 | Peterson et al. |
| 2018/0276393 | A1* | 9/2018 | Allen ..................... G06F 3/0482 |
| 2018/0276402 | A1* | 9/2018 | Allen ................... G06F 21/6245 |

\* cited by examiner

*Primary Examiner* — Susan I McFadden
(74) *Attorney, Agent, or Firm* — Fox Rothschild LLP (57) ABSTRACT

A method of obfuscating at least a portion of content of an email message may include identifying an email message that has been sent to one or more recipients and that pertains to one or more end user processes of a print environment, identifying a content section of the email message, and identifying one or more delimiters associated with the identified content section. The method involves determining whether the identified content section includes the delimiters, and if so, generating an obfuscated content section by obfuscating all content of the identified content section except the one or more identified delimiters. The method includes analyzing the obfuscated content section to ascertain information relevant to the one or more end user processes, and associating the ascertained information with one or more of the one or more end user processes.

23 Claims, 10 Drawing Sheets

Attachment1; Attachment 2

FIG. 5A rtsg223ksl, eefwpf43f3

FIG. 5B

| date | bytes | from | to | subject | body | attachments |
|---|---|---|---|---|---|---|
| 1/30/2017 16:46 | 34154 | abc@xyz.com | abc@xyz.com | Scanned from a Xerox Multifunction Printer | Please open the attached document. It was scanned and sent to you using a Xerox Multifunction Printer. Attachment File Type: pdf, Multi-Page Multifunction Printer Location: USA-0111-001-L3-WC7845 Device Name: xrx9c934e1dad38 For more information on Xerox products and solutions, please visit http://www.xerox.com | Scanned from a Xerox Multifunction Printer.pdf: |

FIG. 6A

<table>
<tr><th>date</th><th>bytes</th><th>from</th><th>to</th><th>subject</th><th>body</th><th>attachments</th></tr>
<tr><td>1/30/2017 16:46</td><td>34154</td><td>Qe~gm.Ruyre@cre | c.x | z</td><td>Qe~gm.Ruyre@cre | c.x | z;</td><td>Hxvyyrw qe | z v Cre | c<br>Zblg~qbyxg~ | y [ e~ygre</td><td>[lrvhr | {ry gsr vggvxsrw w | xbzryg. ^g dvh hxvyyrw vyw<br>hryg g | n|b bh˜yt v Cre | c Zb g˜qbyxg˜ |y [e˜ygre.<br>Vggvxszryg Q˜ Gn{r: {wq, Zb g˜-[vtr Zb g˜qbyxg˜ | y<br>[e˜ygre _| xvg˜ |y: 8HV-0111-001-_3-DX7845 Wra˜xr Yvzr:<br>cec9x934r1wvw38 Q| e z| er˜yq | ezvg˜| y |y Cre | c<br>{e | wbxgh vyw h | bg˜ | yh, {rvhr a˜h˜g<br>sgg{://ddd.cre | c.x | z</td><td>Hxvyyrw qe | z v Cre | c<br>Zblg~qbyxg~ | y<br>[ e~ygre.{wq;</td></tr>
</table>

FIG. 6B

| date | bytes | from | to | subject | body | attachments |
|---|---|---|---|---|---|---|
| 1/30/2017 16:46 | 34154 | e1e6343915503a639b9b80 5919f985b8d1 | e1e6343915503a639b9b80 8059191985b8d1; | 65550e198e8a61214 c8fe78d71d4d75d | 4d2074bd8dc92cd7c 2504ccd00495aeb | 3951c0153c6584c13019 88803ee6f3db; |

FIG. 6C

| END USER PROCESS | USER / GROUP | EMAIL INFORMATION |
|---|---|---|
| PROCESS 1 | GROUP A | EMAIL INFORMATION X |
| PROCESS 2 | GROUP B | EMAIL INFORMATION Y |
| PROCESS 3 | USER 1, USER 2, USER 3 | EMAIL INFORMATION Z |

METHODS AND SYSTEMS FOR PERFORMING STRUCTURE-PRESERVING OBFUSCATION ON EMAILS

BACKGROUND

Email messages contain information that is useful in detecting and analyzing workflows in a particular environment. For instance, in a print environment, an email from a print device that includes a scanned attachment may be indicative of one or more workflow steps. However, emails may also include private information that is not relevant in analyzing or detecting workflows. As such, a solution that obfuscates email content while preserving email structure information would be beneficial.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system for obfuscating at least a portion of content of an email message includes an electronic device and a computer-readable storage medium having one or more programming instructions that, when executed, cause the electronic device to perform one or more actions. The system identifies an email message that has been sent to one or more recipients and that pertains to one or more end user processes of a print environment, Optionally, the system may identify an email message that has been sent to one or more recipients who are associated with one or more of the end user processes.

The system identifies a content section of the email message. The content section may include one or more of the following: a data content section, a sender content section, a recipient content section, a subject line content section, a body content section, and an attachment content section. The system may identify a content section by retrieving a rule set that includes one or more keywords from a data store, applying the rule set to a portion of the email message to determine whether the portion includes one or more of the one or more keywords, and in response to determining that the portion includes one or more of the one or more keywords, identifying the portion as the content section.

The system identifies one or more delimiters associated with the identified content section. A delimiter may be a regular expression, a semicolon, or a symbol. To identify one or more delimiters, the system may search a data store for one or more delimiters associated with the content section.

The system determines whether the identified content section includes one or more of the one or more identified delimiters. In response to determining that the identified content section includes one or more of the one or more identified delimiters, the system generates an obfuscated content section by obfuscating all content of the identified content section except the one or more identified delimiters. Obfuscating the content may involve identifying, from the one or more delimiters, a first occurring delimiter in the identified content section, identifying a portion of the identified content section that precedes the first occurring delimiter, and obfuscating the identified portion of the identified content section.

Optionally, obfuscating content may involve identifying a second occurring delimiter in the identified content section identifying a second portion of the identified content section that is between the first occurring delimiter and the second occurring delimiter, and obfuscating the second portion of the identified content section.

Optionally, obfuscating content may involve encrypting the identified content section but not the identified delimiters, generating a hash of the content but not the identified delimiters, and/or performing alpha character replacement on the content of the identified content section with exception of the identified delimiters.

The system analyzes the obfuscated content section to ascertain information relevant to the one or more end user processes. The system associates the ascertained information with one or more of the one or more end user processes.

Optionally, a delimiter may be a semicolon and a content section may be an attachment content section. The system may analyze the obfuscated content section to ascertain information relevant to the one or more end user processes by determining a number of semicolons present in the attachment content section, and determining that the email message comprises a number of attachments equal to the determined number of semicolons plus one.

Optionally, a delimiter may be a semicolon and a content section may be a recipient content section. The system may analyze the obfuscated content section to ascertain information relevant to the one or more end user processes by determining a number of semicolons present in the recipient content section, and determining that the email message was sent to a number of recipients equal to the determined number of semicolons plus one.

DETAILED DESCRIPTION

The following terms shall have, for purposes of this application, the respective meanings set forth below:

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

An "end user process" refers to one or more steps, performed in a certain order, to accomplish a task. For instance, an example end user process for the submission of a particular form may involve retrieving a document, printing the document, signing the document, and scanning the signed document to a particular destination.

A "print device" refers to a machine having hardware capable of reading a digital document file and use the information from the file and associated print instructions to print of a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device.

A "print environment" refers to a location at which one or more print devices are present. Example print environments include, without limitation, an office (or a floor, a building, or a portion thereof of an office), a manufacturing facility, a print shop and/or the like.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In various embodiments, a process detection system may analyze one or more emails as part of its analysis. A process detection system refers to a system that automatically discovers potential end user processes in an environment. Emails may include information relevant to one or more potential end user processes. For example, an email that is sent to a user from a certain email address may indicate that the email initiated from a print device and contains a document attachment. This may indicate that a certain workflow includes a step of scanning a document to a user. As another example, an email that is sent to a user having a certain subject line, such as "scanned from a multifunction device" may indicate that the email initiated from a multi-function device and includes a document attachment.

Figure 1:
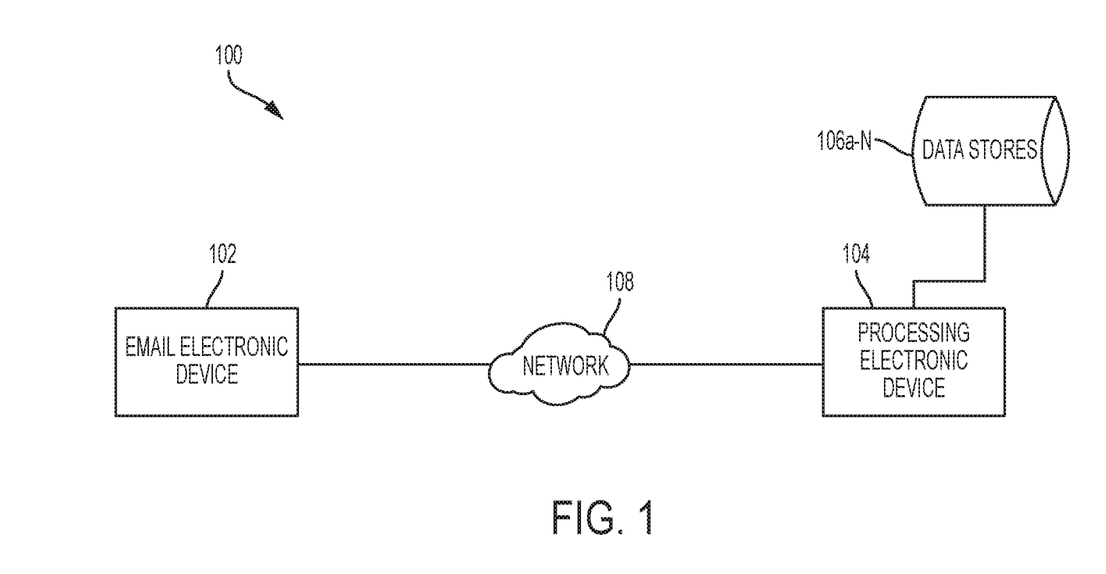
FIG. 1 illustrates an example system for obfuscating email information according to an embodiment.

FIG. 1 illustrates an example system for obfuscating email information according to an embodiment. As illustrated in FIG. 1, a system 100 may include an email electronic device 102 and a processing electronic device 104. The email electronic device 102 refers to an electronic device that stores or has access to one or more email messages. For instance, an email electronic device 102 may be an email server, a user electronic device on which one or more email messages are stored (such as, for example, a laptop or tablet), and/or the like. A processing electronic device 104 refers to an electronic device that performs at least part of an obfuscation process on one or more email messages.

As illustrated by FIG. 1, a processing electronic device 104 may include or have access to one or more data stores 106a-N. The data stores 106a-N may store information pertaining to email messages, obfuscating email messages, information pertaining to one or more end user processes and/or the like. The email electronic device 102 and the processing electronic device may communicate with one another via one or more communication networks 108. A communication network 108 may be a local area network (LAN), a wide area network (WAN), a mobile or cellular communication network, an extranet, an intranet, the Internet and/or the like.

Figure 2:
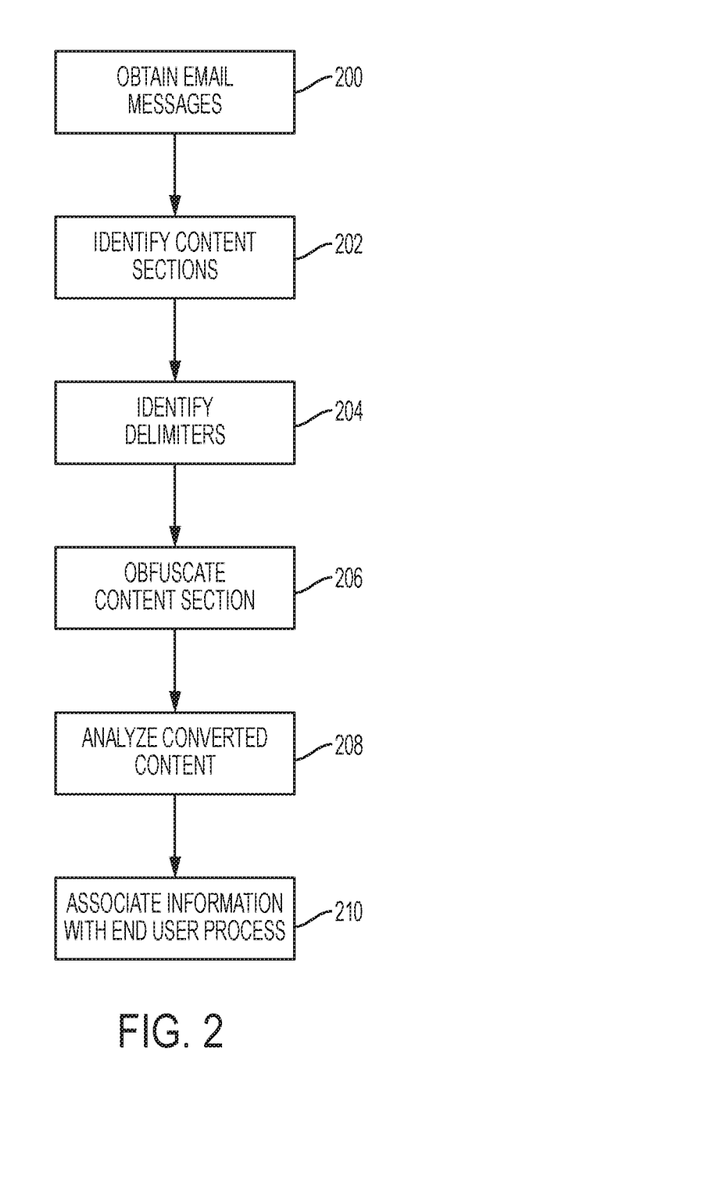
FIG. 2 illustrates an example method of obfuscating email information according to an embodiment.

FIG. 2 illustrates an example method of obfuscating email information according to an embodiment. As illustrated by FIG. 2, a system obtains 200 one or more email messages. A system may obtain 200 one or more email messages from an email server associated with an environment or from an email program or application. For example, one or more email messages may pertain to one or more end user processes of an environment such as, for example, a print environment. For instance, a system may identify one or more end user processes for analysis or detection. The system may then try to obtain 200 email messages that are associated with the identified end user processes. The email messages that are obtained may be associated with a particular user or users, such as for example, users in an environment. In various embodiments, the email messages that are obtained may be ones that are sent and/or received within a certain period of time.

As an example, a system may be able to offer insight into existing end user processes in an environment by analyzing one or more actions that are performed in the environment. One of the actions that a system may analyze is the sending and receiving of emails. Emails may contain information that is important to the analysis of end user processes. Emails sent by a particular user or sent to a particular user in the environment may provide details about one or more end user processes performed by that user or by a group to which that user belongs, such as, for example, a department, an organization, a desk location and/or the like.

Figure 3:
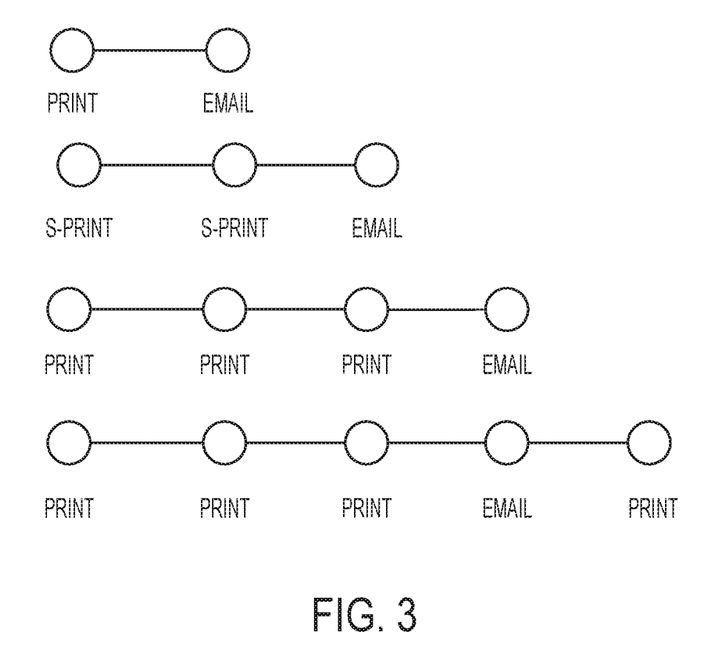
FIG. 3 illustrates example end user processes in an environment according to an embodiment.

For instance, a user may belong to a certain group in an environment. To complete a task for the group, the user may print a form, sign the form, and send the signed form to the other members of the group. This may be an example of an end user process in the environment. FIG. 3 illustrates example end user processes in an environment according to an embodiment.

In order to gain more insight into this end user process, the system may analyze details of the email itself. For instance, it may be helpful to understand how many recipients were included on the email and how many attachments were included in the email. However, the email may also include private information that is not relevant in analyzing or detecting the end user process. This disclosure discusses how to obfuscate such information, among other information, while retaining certain structure of the email.

As part of its end user process analysis, a system may obtain 200 one or more emails that are relevant to the analysis. For instance, if the system is analyzing end user processes for a particular user, the system may analyze one or more emails that are sent by or received by that user. As another example, if the system is analyzing end user processes for a particular department in an environment, the system may analyze one or more emails that are sent to or received by one or more members of that department. The system may obtain 200 the relevant emails from one or more data stores. For instance, a data store may store email messages that are sent or received during a certain timeframe. The system may obtain 200 relevant emails by searching the data store on users (e.g., using a unique user identifier), on groups or sub-groups of users, location of users, receipt or sent time and/or the like.

Figure 4:
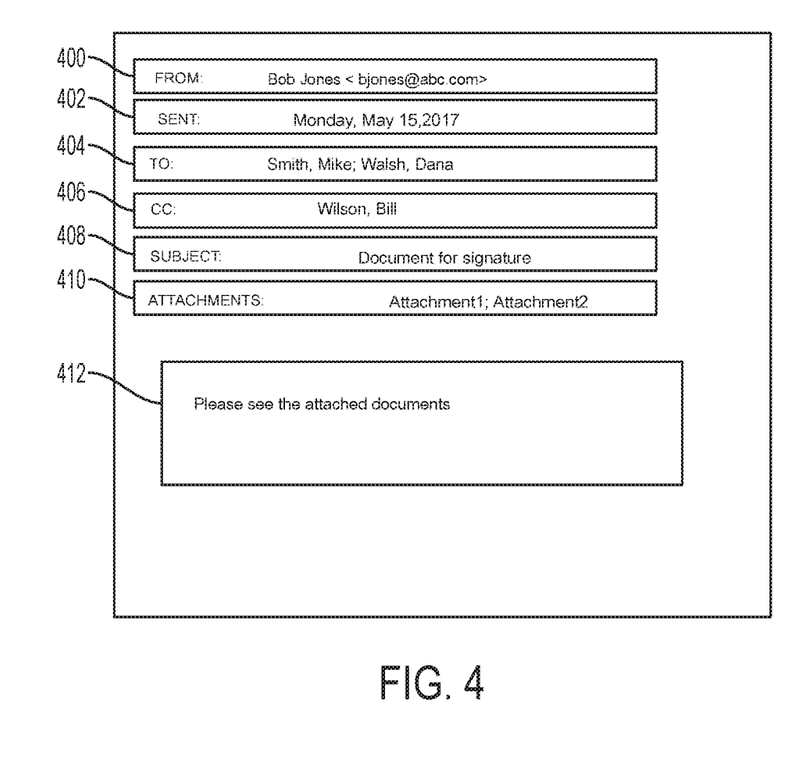
FIG. 4 illustrates example content sections according to an embodiment.

Referring back to FIG. 2, for one or more of the obtained email messages, the system identifies 202 one or more content sections of the email message. A content section refers to a portion of an email message. FIG. 4 illustrates example content sections according to an embodiment. As shown in FIG. 4, example content sections may include, without limitation, a sender section 400, a date section 402, a recipient section 404, a carbon copy/blind carbon copy section 406, a subject line section 408, an attachment section 410, and a body section 412.

A system may identify 202 one or more content sections using one or more rules. A rule set may be stored in one or more data stores, and accessed by the system to identify one or more content sections. For example, a rule set may include an indication of a content section and one or more corresponding keywords. If one or more of the keywords is identified in an email message, the portion of the email message containing the keyword(s) may be identified as the corresponding content section.

As an example, a rule set may include a rule that a sender content section of an email message includes the word "From." As such, the system identifies 202 a portion of an email message containing the word "From" as the sender content section. Additional and/or alternate keywords and content sections may be used within the scope of this disclosure.

For one or more of the identified content sections of an email message, the system identifies 204 whether the section includes any delimiters. A delimiter refers to one or more regular expressions, characters, symbols or other markings that separate information within a content section. For instance, a delimiter in a recipient content section of an email message may be a semicolon as a semicolon typically separates email addresses in a recipient section of an email message.

As another example, a delimiter in a subject content section of an email message may be "Re:", "Fwd:", variations thereof and/or the like. These delimiters may indicate that an email message is a reply to one or more previous email messages in a chain, that the email message is a forwarded message, and/or the like.

In various embodiments, an indication of one or more delimiters and associated content sections may be stored in one or more data stores. The system may access the data stores to identify relevant delimiters for a particular content section, and then parse the relevant content section of an email message to identify 204 whether any of the identified delimiters are present.

The system may obfuscate 206 at least a portion of an email message to generate converted email content. Obfuscation refers to changing the content of one or more portions of an email message so its meaning is not readily ascertainable. The system may obfuscate 206 an email message by applying one or more obfuscation techniques to the portion. Examples of obfuscation techniques include, without limitation, encryption, hashing and alpha character replacement. For example, a system may use SHA1 hashing, MD5 hashing, string encryption and/or the like to obfuscate at least a portion of an email message.

The system may not obfuscate the identified delimiters in the email message. The identified delimiters may remain as-is in the email message while the remaining content of the email message may be obfuscated 206. As such, certain structure details of an email message may be maintained while content of the email message may be obfuscated.

Figure 5A:
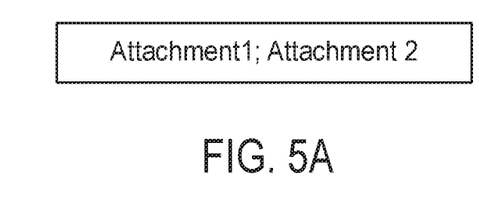
FIGS. 5A and 5B illustrate example content sections according to various embodiments.
Figure 5B:
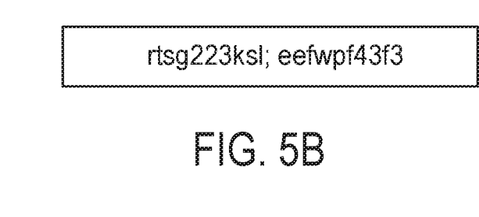

The system may parse a content section to identify a portion of the content section that precedes a first identified delimiter. FIG. 5A illustrates an example attachment content section according to an embodiment, where an associated delimiter is a semicolon. The system may parse this attachment content section to identify the portion that precedes the first semicolon (i.e., "Attachment1"). The system obfuscates this portion of the content section. The system then identifies a portion of the content section that follows the first identified delimiter or that exists between the first identified delimiter and a second identified delimiter. For instance, with respect to FIG. 3A, the system identifies the content following the first semicolon (i.e., "Attachment2"). The system obfuscates this portion of the content section. This process may be repeated for each delimiter until there is no further content to parse. FIG. 5B illustrates an obfuscated version of the content section illustrated in FIG. 5A. As shown in FIG. 5B, the converted email content includes obfuscated content and un-obfuscated delimiters.

As mentioned above, an example of an obfuscation technique is encryption. A system may apply an encryption algorithm to the portion to convert the plaintext of the portion to ciphertext. The encryption algorithm may utilize a public or private key scheme to generate the ciphertext.

Another example of an obfuscation technique is hashing. Hashing involves transforming a character or string of characters into a different value that represents the original character(s).

Another example of an obfuscation technique is alpha character replacement. Alpha character replacement involves replacing only alpha characters of content while preserving all non-alpha characters. The replacement may be done randomly or in accordance with one or more rules or guidelines to support searching and matching.

Figure 6A:
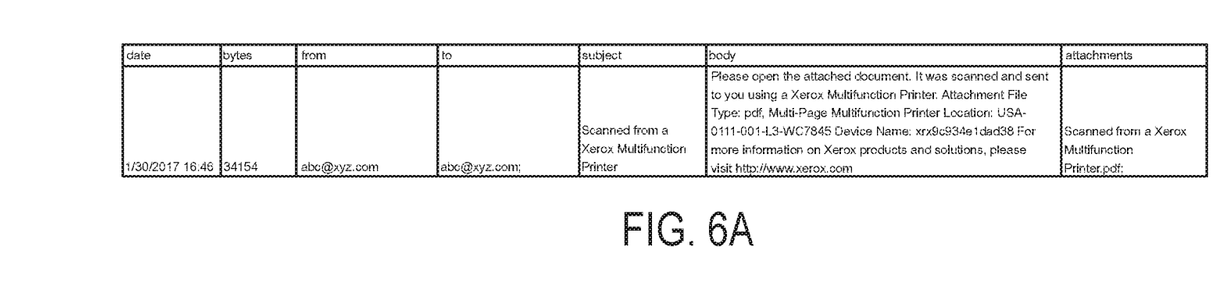
FIGS. 6A, 6B and 6C illustrate example content sections according to various embodiments.
Figure 6B:
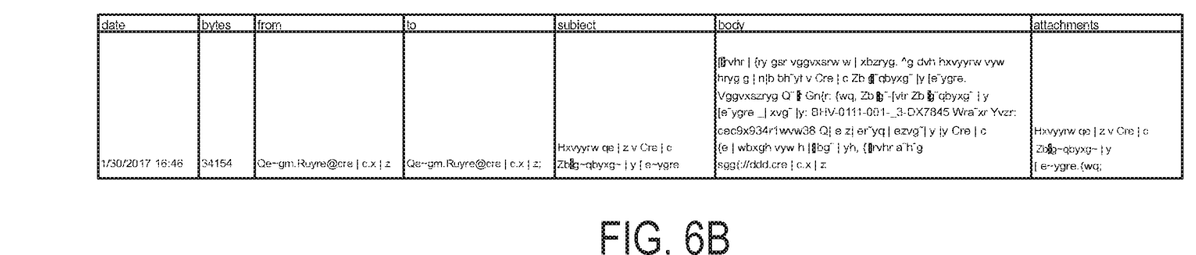
Figure 6C:
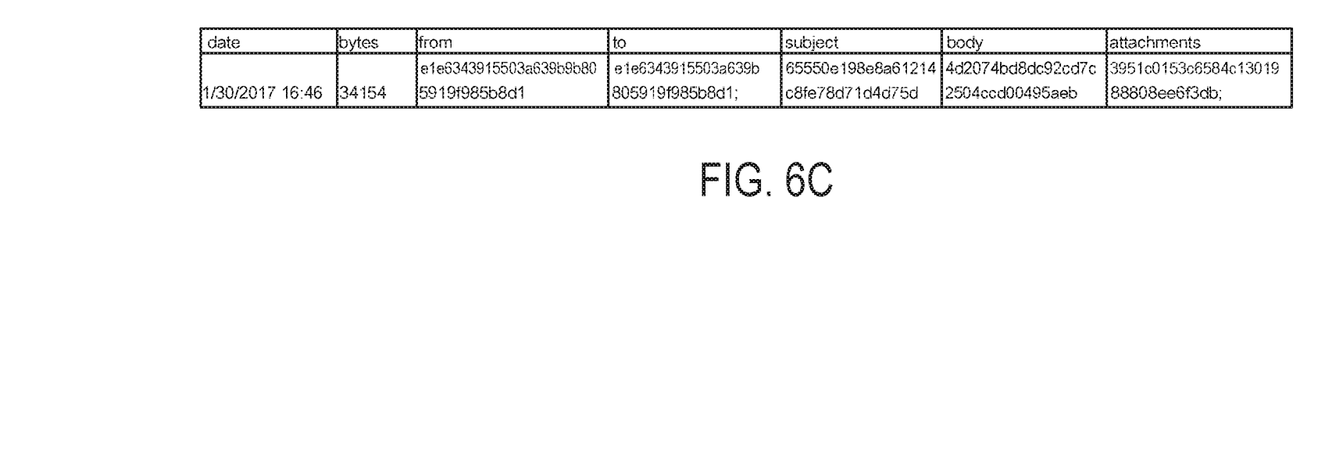

FIG. 6A illustrates example unobfuscated email content according to an embodiment. FIG. 6B illustrates an example result of performing alpha character replacement on the content illustrated in FIG. 6A according to an embodiment. FIG. 6C illustrates an example result of performing hashing on the content illustrated in FIG. 6A according to an embodiment.

As illustrated by FIG. 6B, the result of performing alpha character replacement shows the structure of the content without disclosing the content itself. For instance, because the "@" symbol is preserved, an email address can readily be identified, although the specific email address is obfuscated. Similarly, referring to FIG. 4C, because the semicolon delimiter in the recipient content section is preserved, it is understandable that "e1e6343915503a6396805919P985b8d1" refers to an email address because it is followed by a delimiter.

Referring back to FIG. 2, the system may analyze 208 at least a portion of the converted email content. A system may analyze 208 at least a portion of converted email content to ascertain email information relevant to one or more end user processes. Examples of such email information may include, without limitation, a number of attachments to an email message, a number of recipients of an email message, a number of times an email message was replied to, a timestamp associated with an email message (sending or receiving) and/or the like.

For example, a system may determine how many semicolons are present in a recipient content section and may extrapolate that the email was sent to a certain number of recipients (e.g., if a recipient content section includes three semicolons, the system may extrapolate that the email message was sent to four recipients). Similarly, a system may determine how many semicolons are present in an attachment content section and may extrapolate the number of attachments the email message contains.

Figure 7:
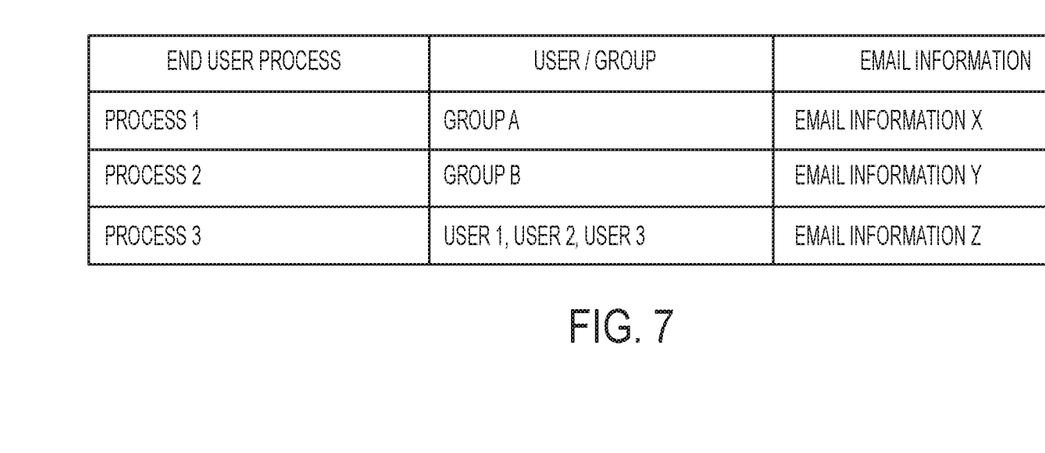
FIG. 7 illustrates an example relational database of end user processes and email information according to an embodiment.

The system may associate 210 at least a portion of the ascertained email information with one or more end user processes. The system may store information pertaining to one or more end user processes in one or more data stores. The system may store at least a portion of the ascertained email information in a manner such that it is associated with one or more end user processes to which it corresponds. For example, email information may be stored in a relational database such that it is associated with one or more corresponding end user processes. FIG. 7 illustrates an example relational database of end user processes and email information according to an embodiment. Additional and/or alternate storage mediums or data structures may be used within the scope of this disclosure.

The system may use this information to make observations about an end user process, to suggest improvements to the flow or efficiency of an end user process, to automate at least a portion of an end user process and/or the like. For instance, if a system may determine that each user of a group is performing an end user process where the user prints a form, signs the form and emails the form to the other users in the group on a weekly basis. The system may suggest that a more efficient solution would be for the users to use electronic signatures instead.

Figure 8:
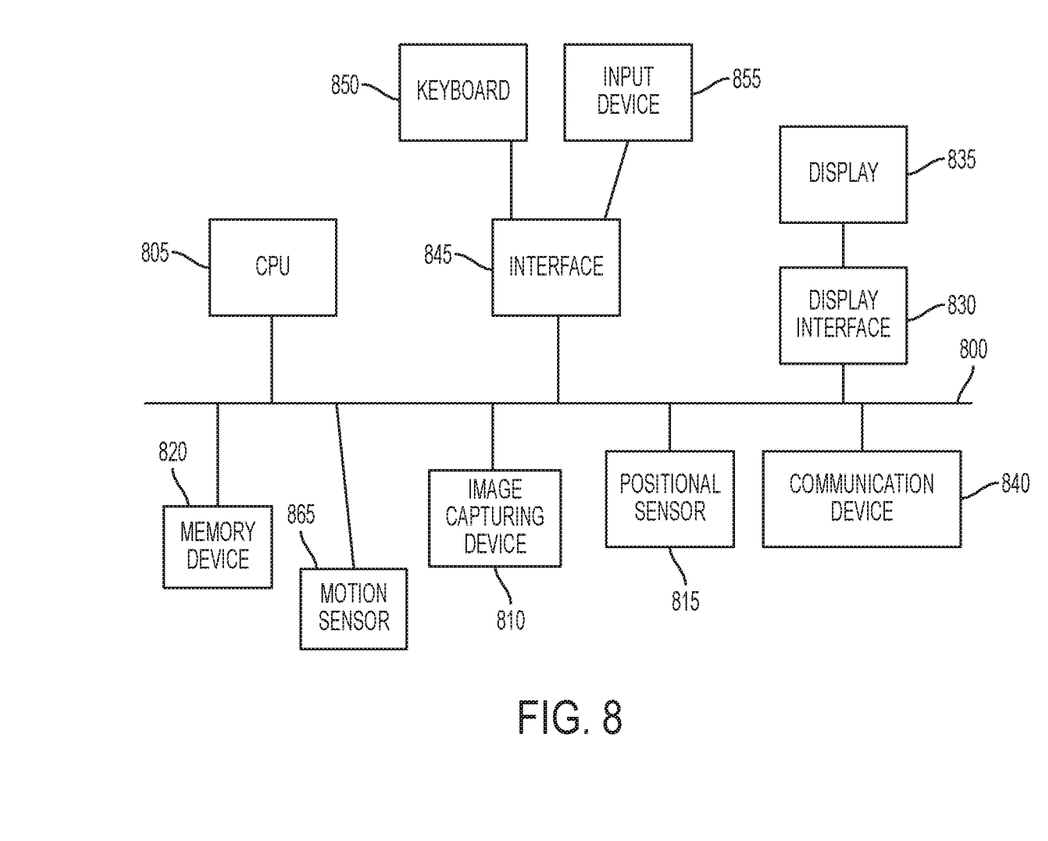
FIG. 8 illustrates a block diagram of example hardware that may be used to contain or implement program instructions according to an embodiment.

FIG. 8 depicts a block diagram of hardware that may be used to contain or implement program instructions, such as those of a cloud-based server, electronic device, virtual machine, or container. A bus 800 serves as an information highway interconnecting the other illustrated components of the hardware. The bus may be a physical connection between elements of the system, or a wired or wireless communication system via which various elements of the system share data. Processor 805 is a processing device that performs calculations and logic operations required to execute a program. Processor 805, alone or in conjunction with one or more of the other elements disclosed in FIG. 8, is an example of a processing device, computing device or processor as such terms are used within this disclosure. The processing device may be a physical processing device, a virtual device contained within another processing device, or a container included within a processing device.

A memory device 820 is a hardware element or segment of a hardware element on which programming instructions, data, or both may be stored. Read only memory (ROM) and random access memory (RAM) constitute examples of memory devices, along with cloud storage services.

An optional display interface 830 may permit information to be displayed on the display 835 in audio, visual, graphic or alphanumeric format. Communication with external devices, such as a printing device, may occur using various communication devices 840, such as a communication port or antenna. A communication device 840 may be communicatively connected to a communication network, such as the Internet or an intranet.

The hardware may also include a user input interface 845 which allows for receipt of data from input devices such as a keyboard or keypad 850, or other input device 855 such as a mouse, a touch pad, a touch screen, a remote control, a pointing device, a video input device and/or a microphone. Data also may be received from an image capturing device 820 such as a digital camera or video camera. A positional sensor 815 and/or motion sensor 865 may be included to detect position and movement of the device. Examples of motion sensors 865 include gyroscopes or accelerometers. An example of a positional sensor 815 is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method of obfuscating at least a portion of content of an email message, the method comprising:
   identifying an email message that has been sent to one or more recipients and that pertains to one or more end user processes of a print environment;
   identifying, by an electronic device, a content section of the email message;
   identifying, by the electronic device, one or more delimiters associated with the identified content section;
   determining whether the identified content section includes one or more of the one or more identified delimiters;
   in response to determining that the identified content section includes one or more of the one or more identified delimiters, generating, by the electronic device, an obfuscated content section by obfuscating all content of the identified content section except the one or more identified delimiters;
   analyzing, by the electronic device, the obfuscated content section to ascertain information relevant to the one or more end user processes; and
   associating, by the electronic device, the ascertained information with one or more of the one or more end user processes.

2. The method of claim 1, wherein identifying an email message comprises identifying the email message that was sent to the one or more recipients, wherein the one or more recipients are associated with one or more of the end user processes.

3. The method of claim 1, wherein identifying a content section of the email message comprises identifying one or more of the following:
a data content section;
a sender content section;
a recipient content section;
a subject line content section;
a body content section; and
an attachment content section.

4. The method of claim 1, wherein identifying a content section of the email message comprises:
retrieving a rule set from a data store, wherein the rule set comprises one or more keywords;
applying the rule set to a portion of the email message to determine whether the portion includes one or more of the one or more keywords; and
in response to determining that the portion includes one or more of the one or more keywords, identifying the portion as the content section.

5. The method of claim 1, wherein identifying one or more delimiters associated with the identified content section comprises searching a data store for one or more delimiters associated with the content section.

6. The method of claim 1, wherein the one or more delimiters comprise one or more of the following:
a regular expression;
a semicolon; or
a symbol.

7. The method of claim 1, wherein generating an obfuscated content section by obfuscating all content of the identified content section except the one or more identified delimiters comprises:
identifying, from the one or more delimiters, a first occurring delimiter in the identified content section;
identifying a portion of the identified content section that precedes the first occurring delimiter;
obfuscating the identified portion of the identified content section.

8. The method of claim 7, further comprising:
identifying a second occurring delimiter in the identified content section;
identifying a second portion of the identified content section, wherein the second portion is between the first occurring delimiter and the second occurring delimiter;
obfuscating the second portion of the identified content section.

9. The method of claim 1, wherein generating the obfuscated content section by obfuscating all content of the identified content section except the identified delimiters comprises encrypting the identified content section but not the identified delimiters.

10. The method of claim 1, wherein generating the obfuscated content section by obfuscating all content of the identified content section except the identified delimiters comprises generating a hash of the content but not the identified delimiters.

11. The method of claim 1, wherein generating the obfuscated content section by obfuscating all content of the identified content section except the identified delimiters comprises performing alpha character replacement on the content of the identified content section with exception of the identified delimiters.

12. The method of claim 1, wherein:
the one or more identified delimiters comprises a semicolon;
the content section comprises an attachment content section;
analyzing the obfuscated content section to ascertain information relevant to the one or more end user processes comprises:
determining a number of semicolons present in the attachment content section, and
determining that the email message comprises a number of attachments equal to the determined number of semicolons plus one.

13. The method of claim 1, wherein:
the one or more identified delimiters comprises a semicolon;
the content section comprises a recipient content section;
analyzing the obfuscated content section to ascertain information relevant to the one or more end user processes comprises:
determining a number of semicolons present in the recipient content section, and
determining that the email message was sent to a number of recipients equal to the determined number of semicolons plus one.

14. A system for obfuscating at least a portion of content of an email message, the system comprising:
an electronic device; and
a computer-readable storage medium comprising one or more programming instructions that, when executed, cause the electronic device to:
identify an email message that has been sent to one or more recipients and that pertains to one or more end user processes of a print environment,
identify a content section of the email message,
identify one or more delimiters associated with the identified content section,
determine whether the identified content section includes one or more of the one or more identified delimiters,
in response to determining that the identified content section includes one or more of the one or more identified delimiters, generate an obfuscated content section by obfuscating all content of the identified content section except the one or more identified delimiters,
analyze the obfuscated content section to ascertain information relevant to the one or more end user processes, and
associate the ascertained information with one or more of the one or more end user processes.

15. The system of claim 14, wherein the one or more programming instructions that, when executed, cause the electronic device to identify an email message comprise one or more programming instructions that, when executed, cause the electronic device to identify the email message that was sent to the one or more recipients, wherein the one or more recipients are associated with one or more of the end user processes.

16. The system of claim 14, wherein the one or more programming instructions that, when executed, cause the electronic device to identify a content section of the email message comprise one or more programming instructions that, when executed, cause the electronic device to:
retrieve a rule set from a data store, wherein the rule set comprises one or more keywords;
apply the rule set to a portion of the email message to determine whether the portion includes one or more of the one or more keywords; and
in response to determining that the portion includes one or more of the one or more keywords, identify the portion as the content section.

17. The system of claim 14, wherein the one or more programming instructions that, when executed, cause the electronic device to generate an obfuscated content section by obfuscating all content of the identified content section except the one or more identified delimiters comprise one or more programming instructions that, when executed, cause the electronic device to:
   identify, from the one or more delimiters, a first occurring delimiter in the identified content section;
   identify a portion of the identified content section that precedes the first occurring delimiter; and
   obfuscate the identified portion of the identified content section.

18. The system of claim 17, wherein the computer-readable storage medium further comprises one or more programming instructions that, when executed, cause the electronic device to:
   identify a second occurring delimiter in the identified content section;
   identify a second portion of the identified content section, wherein the second portion is between the first occurring delimiter and the second occurring delimiter; and
   obfuscate the second portion of the identified content section.

19. The system of claim 14, wherein the one or more programming instructions that, when executed, cause the electronic device to generate the obfuscated content section by obfuscating all content of the identified content section except the identified delimiters comprise one or more programming instructions that, when executed, cause the electronic device to encrypt the identified content section but not the identified delimiters.

20. The system of claim 14, wherein the one or more programming instructions that, when executed, cause the electronic device to generate the obfuscated content section by obfuscating all content of the identified content section except the identified delimiters comprise one or more programming instructions that, when executed, cause the electronic device to generate a hash of the content but not the identified delimiters.

21. The system of claim 14, wherein the one or more programming instructions that, when executed, cause the electronic device to generate the obfuscated content section by obfuscating all content of the identified content section except the identified delimiters comprise one or more programming instructions that, when executed, cause the electronic device to perform alpha character replacement on the content of the identified content section with exception of the identified delimiters.

22. The system of claim 14, wherein:
   the one or more identified delimiters comprises a semicolon;
   the content section comprises an attachment content section;
   the one or more programming instructions that, when executed, cause the electronic device to analyze the obfuscated content section to ascertain information relevant to the one or more end user processes comprise one or more programming instructions that, when executed, cause the electronic device to:
   determine a number of semicolons present in the attachment content section, and
   determine that the email message comprises a number of attachments equal to the determined number of semicolons plus one.

23. The system of claim 14, wherein:
   the one or more identified delimiters comprises a semicolon;
   the content section comprises a recipient content section;
   the one or more programming instructions that, when executed, cause the electronic device to analyze the obfuscated content section to ascertain information relevant to the one or more end user processes comprise one or more programming instructions that, when executed, cause the electronic device to:
   determine a number of semicolons present in the recipient content section, and
   determine that the email message was sent to a number of recipients equal to the determined number of semicolons plus one.

* * * * *